United States Patent
Dick

[11] 3,803,397
[45] Apr. 9, 1974

[54] SIDE MARKER LAMP FOR MOTOR VEHICLES

[75] Inventor: Heinz Dick, Odenthal-Osenua, Germany

[73] Assignee: Ford Motor Company, Dearborn, Mich.

[22] Filed: Feb. 12, 1973

[21] Appl. No.: 331,925

[30] Foreign Application Priority Data
Aug. 28, 1972 Germany............................ 2242264

[52] U.S. Cl.............. 240/8.2, 240/7.1 R, 240/41.6
[51] Int. Cl. .......................... F21v 7/00, B60q 1/32
[58] Field of Search....... 240/8.2, 8.22, 7.1 R, 73 R, 240/73 BC, 41.6, 44.1

[56] References Cited
UNITED STATES PATENTS

| | | | |
|---|---|---|---|
| 3,679,890 | 7/1972 | Pool.................................. | 240/41.6 |
| 3,235,720 | 2/1966 | Bridge................................ | 240/8.2 |
| 3,678,635 | 7/1972 | Vagi et al. ........................ | 240/8.2 |
| 2,571,130 | 10/1951 | Hargis................................ | 240/8.2 |
| 2,918,566 | 12/1959 | Lunsford.......................... | 240/7.1 R |
| 3,244,869 | 4/1966 | Buck.................................. | 240/7.1 R |
| 2,742,564 | 4/1956 | Bronson et al................... | 240/7.1 R |
| 1,739,641 | 12/1929 | Lessmann........................ | 240/41.6 |
| 3,017,500 | 1/1962 | Pezzopane...................... | 240/8.2 |

*Primary Examiner*—Richard L. Moses
*Attorney, Agent, or Firm*—John J. Roethel; Keith L. Zerschling

[57] ABSTRACT

A side parking or marker lamp for motor vehicles, with a frame installed in a recessed fashion in the body panel, against which frame a lamp housing seats, the housing being directly connected to a light lens.

4 Claims, 2 Drawing Figures

SIDE MARKER LAMP FOR MOTOR VEHICLES

BACKGROUND OF THE INVENTION

Side parking or marker lamps are a regulation fitment in some countries, for example, in the United States of America. The light lens of these side parking lamps must have a certain area and certain angular positions in horizontal and vertical directions in relation to the fore and aft central plane of the vehicle in order to achieve the legally prescribed back-lighting level.

From the prior art it is well-known, for a variety of vehicle models with different body designs, to use various side marker lamps in the prescribed area of application of such lamps, the designs of which lights differ from one another in respect of their frames which are arranged to accord with the angular difference between the body panel profile and the requisite angular position of the light lens.

This known kind of design makes it necessary to provide a new construction as well as new tools for the frame in respect of each vehicle model that is to be equipped with side marker lamps.

The object of the present invention is to provide a side marker lamp of the kind introductorily described which can be used for all vehicle models without necessitating extensive, modified tools for its manufacture.

SUMMARY OF THE INVENTION

In accordance with the invention, this object is achieved in that the lamp housing, together with the light lens, is accommodated in an adjustable manner in the frame and can be locked in a specific position by a fixing compound.

A part of the lamp housing, e.g., the central part containing the bulb, is given the form of a section of a sphere and adjustably assembled in a circular opening in the frame, and can be secured a position by a fixing compound. The fixing compound can be constituted by an adhesive applied directly to the spherical section portion at the center of the light body.

The fixing compound, however, can also be applied in the form of a bead of solidifying sealing compound, the latter being arranged along the opening of the frame.

The fixing compound can equally well consist of the synthetic material of the lamp housing and frame, themselves, if this material can be softened by the use of ultrasonic or mirror welding techniques.

In order to be able to manufacture different side marker lights with light lenses inclined at different angles, for different vehicle models, it is merely necessary, at the time of assembly of these marker lights, to use corresponding fixtures by means of which the lamp housing is secured in the requisite angular position and fixed there by the fixing compound.

Identification of the side marker lights, which are now typed to a vehicle model, can be achieved by using different part numbers.

The invention will be explained in more detail making reference to an example illustrated in the drawing.

DESCRIPTION OF THE PREFERRED EMBODIMENT

Figure 1:
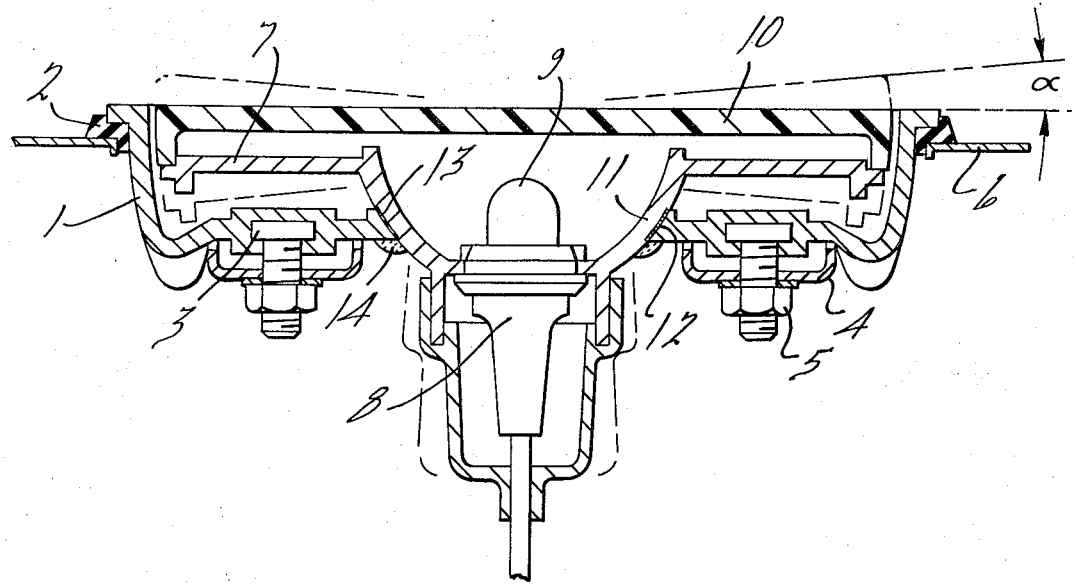
FIG. 1 illustrates a horizontal section through a side marker light in accordance with the invention.
Figure 2:
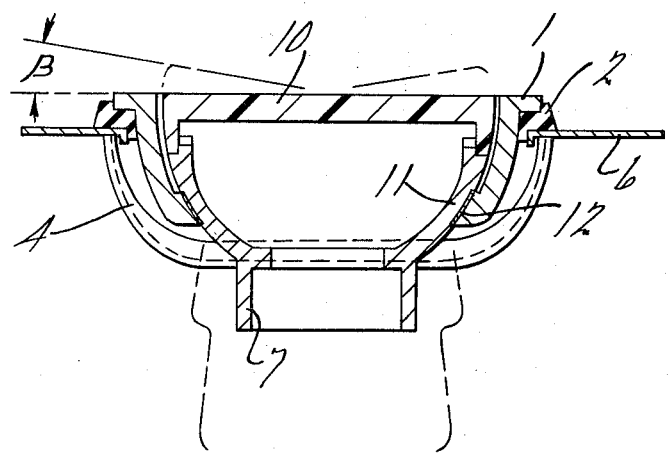
FIG. 2 illustrates a vertical section through the side marker light of FIG. 1.

The side marker light illustrated in the drawing consists of a frame 1 having a peripheral flange. The frame is installed in a recessed fashion in the body panel 6, through the medium of a circumferential seal 2, screws 3 anchored in the frame 1, clamping brackets 4 secured to vehicle body structural members (not shown) by nuts 5.

The frame 1 supports a lamp housing 7 which accommodates a bulb socket 8 with a bulb 9 and is attached in sealed fashion to a light lens 10.

The central body portion 11 of the lamp housing 7, which portion accommodates the bulb socket 8, has the form of a section of a sphere and is adjustably mounted in a circular opening 12 in the frame 1. The circular opening can itself take the form of a section of a sphere but may equally well simply be constituted by an opening with a chamfered or radiussed edge.

The light lens 10 can thus be adjusted through the positioning of the lamp housing 7 in relation to the frame 1, which is flush with the body panel profile, in a horizontal direction, indicated by the angle $\alpha$, and in a vertical direction, indicated by the angle $\beta$, in order to give the light lens the requisite angular setting.

This adjustment of the angular position of the light lens 10 will preferably be carried out during the preliminary assembly of the side marker light, the light lens 10 being secured by a fixture in the desired angular position, and locked or fixed there by an adhesive 13 or sealing compound 14.

In this context, the fixing compound can be an adhesive 13 applied directly to the surface of the spherical section of the central portion 11 of the light body 7. The fixing compound, however, can equally well take the form of a setting sealing compound 14 applied as a bead along the opening 12 of the frame 1. The sealing compound, again, can be constituted by the synthetic material of the lamp housing 7 and frame 1, themselves, if this material is softened by using ultrasonic or mirror welding techniques.

The invention thus provides a side marker light which has a standard design for the most varied vehicle models and can be used in conjunction with the same irrespective of the difference in their body panel profiles in the area of application of the marker lamp. It is evident that with this simplification, a considerable economy in terms of design, tooling and manufacturing costs can be achieved.

I claim:

1. A side marker lamp adapted to be installed in an opening in a motor vehicle body panel, comprising:
    a frame having a body portion recessed in the panel opening and a peripheral flange abutting the outer surface of the panel around the perimeter of the opening,
    a circumferential seal interposed between the flange and panel surface,
    clamping brackets clamping the frame against the seal in fixed position in the panel opening,
    a lamp housing having a central body portion in the form of a section of a sphere providing a pocket adapted to receive a light bulb, the central body portion of the lamp housing being received in abutting relation to the wall of a complementary circular opening in the frame, the central body portion and abutting wall of the circular opening coacting to provide limited universal adjustment of the lamp housing relative to the fixed frame, a fixing compound securing the central body portion to the wall of the circular opening at a predetermined angular relationship relative to the vehicle body panel, and lens means fixed to the lamp housing to enclose a light bulb.

2. A side marker lamp as claimed in claim 1, in which the fixing compound is an adhesive applied directly to the spherical section surface of the center portion of the lamp housing body.

3. A side marker lamp as claimed in claim 1, in which the fixing compound is a setting sealing compound which is applied in the form of a bead along the circular opening in the frame.

4. A side marker lamp as claimed in claim 1, in which the lamp housing body and frame are of synthetic material, the fixing compound being constituted by the synthetic material of the lamp housing and frame body, themselves, the material being softened by ultrasonic or mirror welding techniques.

* * * * *